United States Patent [19]

Schreckenberg et al.

[11] 4,196,276

[45] * Apr. 1, 1980

[54] HIGH-MOLECULAR WEIGHT, SEGMENTED, POLYCARBONATE ELASTOMERS

[75] Inventors: Manfred Schreckenberg, Krefeld; Klaus König, Leverkusen; Dieter Freitag; Volker Serini, both of Krefeld, all of Fed. Rep. of Germany

[73] Assignee: Bayer Aktiengesellschaft, Leverkusen, Fed. Rep. of Germany

[*] Notice: The portion of the term of this patent subsequent to Oct. 2, 1996, has been disclaimed.

[21] Appl. No.: 869,743

[22] Filed: Jan. 16, 1978

[30] Foreign Application Priority Data

Jan. 22, 1977 [DE] Fed. Rep. of Germany ....... 2702626

[51] Int. Cl.$^2$ ..................... C08G 63/24; C08G 63/64
[52] U.S. Cl. ..................... 528/176; 525/146; 525/148; 528/196; 528/205
[58] Field of Search ........................ 260/47 XA, 873; 528/176, 177, 196, 205

[56] References Cited

U.S. PATENT DOCUMENTS

| | | | |
|---|---|---|---|
| 3,367,993 | 2/1968 | Caldwell et al. | 260/47 XA |
| 3,419,635 | 12/1968 | Vaughn | 260/47 XA |
| 3,461,187 | 8/1969 | Cantrill | 260/873 |
| 3,641,200 | 2/1972 | Matzner | 525/415 |
| 3,843,708 | 10/1974 | Matzner | 260/463 |
| 4,001,184 | 1/1977 | Scott | 528/179 |

OTHER PUBLICATIONS

Goldberg, E. P.; "Elastomeric Polycarbonate Block Copolymers," *Journal of Polymer Science*: Part C, vol. 55, No. 4, pp. 707–730.

*Primary Examiner*—Wilbert J. Briggs, Sr.
*Attorney, Agent, or Firm*—Gene Harsh; Lawrence S. Pope

[57] ABSTRACT

High-molecular weight polycarbonate elastomers are produced by reacting polymer segments having an average molecular weight ($\overline{M}n$) of more than 600 and carboxyl groups with diphenols and phosgene according to the two-phase boundary polycondensation process at a pH value between about 9 and about 14 and a temperature between about 0° C. and 80° C. and, thereafter, either heat-treating the resulting reaction products at temperatures between about 40° C. and about 100° C. or gelling the resulting reaction products in solution in organic solvents.

14 Claims, No Drawings

HIGH-MOLECULAR WEIGHT, SEGMENTED, POLYCARBONATE ELASTOMERS

SUMMARY OF THE INVENTION

The present invention relates to a process for the preparation of high-molecular weight polycarbonate elastomers, containing incorporated polymer segments containing carboxyl groups, wherein carboxyl group containing polymers have average molecular weights $\overline{M}n$ (number-average of the molecular weight, determined, for example, via the acid number of the segments containing carboxyl groups) of more than 600, preferably of more than 800 and especially of between 1,000 and 20,000, are reacted with diphenols and phosgene in accordance with the known two-phase boundary polycondensation process at a pH value between about 9 and about 14 and a temperature between about 0° C. and about 80° C., preferably between about 15° C. and about 40° C., and thereafter, either heat-treating the resulting reaction products at temperatures between about 40° C. and about 100° C. for between about 5 minutes and 24 hours or gelling the resulting reaction products in solution in organic solvents.

In addition, the invention relates to the polycarbonate elastomers obtainable according to the process of the invention which, as a result of the polycarbonate constituent and the polymer segment constituent containing carboxyl, contain at least 2 phases.

The success of the process according to the invention could not be foreseen, because under comparable conditions the majority of dicarboxylic acids with molecular weights $\overline{M}n$ of less than 600, such as terephthalic acid, phthalic acid or adipic acid, do not co-condense by the two-phase interface process. (See J. Pol. Sc. C. No. 4, page 719.)

The reaction of dicarboxylic acids in a non-aqueous medium by the so-called "pyridine process" is known (DT-OS (German Published Specification) No. 1,495,912, U.S. Pat. No. 3,030,331, DT-OS (German Published Specification) No. 1,420,476 and U.S. Pat. No. 3,220,976).

The reaction of long-chain polymers, containing carboxyl groups, in non-aqueous solvents by the so-called pyridine process is also known (DOS (German Published Specification) No. 1,595,777, which corresponds to U.S. Pat. No. 3,461,187 and Netherlands Pat. No. 147,756).

The reaction of dicarboxylic acids by the so-called "transesterification process" is also known (DT-OS (German Published Specification) No. 1,420,475, U.S. Pat. No. 3,169,121 and U.S. Pat. No. 3,207,814).

The reaction of dicarboxylic acids by the so-called "suspension process", using inert organic liquids, is also known (DT-OS (German Published Specification) No. 1,495,906 and U.S. Pat. No. 3,290,409).

The reaction of dicarboxylic acid halides by the two-phase interface process is also known (U.S. Pat. No. 3,207,814, column 6, lines 60 to 65).

All of these process variants for incorporating segments containing carboxyl groups into polycarbonates have disadvantages, either because of the process conditions or because of the properties of the polycarbonate elastomers obtainable by these processes.

The high-molecular weight, segmented, polycarbonate elastomers obtained by the process according to the invention, when built up from purely aliphatic carboxyl group-containing polymers, diphenols and phosgene, are transparent to opaque (depending on the degree of crystallization of the polycarbonate constituent) and elastic, and exhibit a good elongation at break.

The polycarbonate elastomers, obtained by the process according to the invention, from polymers containing aliphatic-aromatic carboxyl groups, diphenols and phosgene are transparent to opaque and, in comparison with the polycarbonate elastomers from polymers containing purely aliphatic carboxyl groups, of somewhat lower elasticity.

The polycarbonate elastomers obtained according to the invention can be subjected to thermoplastic processing at temperatures below about 230° C.; in the case of prolonged exposure to heat, especially above about 240° C., cross-linking can occur.

Polymers, containing carboxyl groups, i.e., COOH-containing polymers having average molecular weights $\overline{M}n$ (number-average) of about 600, preferably of about 800, in particular between 1,000 and 20,000, which are preferably used in the process according to the invention are to be understood as C—C linked polymers which contain 1 to 5 COOH groups, preferably having 2 to 3 COOH groups, but in particular have 2 COOH groups and preferably relate to the following types of compounds: polybutadiene, polyisoprene, butadiene/acrylonitrile copolymers, butadiene/styrene copolymers, butadiene/allyl alcohol copolymers, ethyl acrylate/butadiene copolymers, ethyl acrylate/isoprene copolymers, n-butyl acrylate/isoprene/acrylonitrile terpolymers and butyl acrylate/chloroprene copolymers.

COOH-containing C—C linked polymers which are suitable for the process according to the invention are, for example, the liquid rubbers from Messrs. B. F. Goodrich Chemical Company, under the tradename HYCAR type CTB and CTBN, or from Messrs. Hystl Development Company, under the tradename HYSTL type C-1000 $A_2$.

The C—C linked polymers which are suitable according to the invention, including the above-mentioned commercial products, can be manufactured by free radical polymerization using initiators containing carboxyl groups and/or modifying agents in the manner described in U.S. Pat. No. 3,285,949 and in German Patent Specification No. 1,150,205, or by solution polymerization using lithium metal or organometallic compounds, and after-treating the polymers in order to form carboxyl groups, in the manner described in U.S. Pat. Nos. 3,135,716 and 3,431,235.

The polymers, containing carboxyl groups, which are particularly suitable according to the invention have a molecular weight $\overline{M}n$ of about 1,000 to about 20,000.

Suitable diphenols for the process according to the invention are: hydroquinone, resorcinol, dihydroxydiphenyls, bis-(hydroxyphenyl) alkanes, bis-(hydroxyphenyl) cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α-bis-(hydroxyphenyl)-diisopropylbenzenes, and nuclear-alkylated and nuclear-halogenated compounds thereof. These and further suitable aromatic dihydroxy compounds are described, for example, in U.S. Pat. Nos. 3,028,365; 2,999,835; 3,148,172; 3,271,368, 2,991,273; 3,271,367; 3,280,078; 3,014,891 and 2,999,846.

Preferred diphenols are, for example: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, 2,2-bis-(3,4-dichloro-4-hydroxyphenyl)-propane and 2,2-bis-(3,5-dibromo-4-hydroxyphenyl)-propane.

Particularly preferred diphenols are, for example: 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Any desired mixtures of the above-mentioned diphenols can also be used.

Branched products which have better flow properties during processing are obtained by incorporating small amounts of compounds which are trifunctional or more than trifunctional, in particular those with three or more than three phenolic hydroxyl groups, preferably in an amount of 0.05–2.0 mol % (relative to the diphenols employed). Examples which may be mentioned of compounds which are trifunctional or more than trifunctional are: phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-(4,4'-dihydroxydiphenyl)cyclohexyl]-propane, 2,4-bis-(4-hydroxyphenyl-isopropyl)-phenol, 2,6-bis-(2'-hydroxy-5'-methylbenzyl)-4-methyl-phenol, 2,4-dihydroxybenzoic acid, 2-(4-hydroxyphenyl)-2-(2,4-dihydroxyphenyl)-propane and 1,4-bis-(4,4''-dihydroxytriphenylmethyl)-benzene, as well as 3,3-bis-(4-hydroxyphenyl)-2-oxo-2,3-dihydroindole.

The chain length of the polycarbonate elastomer can be adjusted by adding a chain stopper, for example, a monofunctional phenol, such as phenol, 2,6-dimethylphenol or p-tert.-butyl-phenol, it being possible to use between about 0.1 and 10 mol % per mol of diphenol.

The high-molecular weight, segmented, polycarbonate elastomers are prepared in accordance with the two-phase boundary polycondensation process. For this, one of the above-mentioned diphenols or mixtures of the above-mentioned diphenols are dissolved in an aqueous-alkaline phase. The above-mentioned COOH-containing polymers or their mixtures are likewise dissolved in an organic solvent which is not water-miscible and this solution is added to the first phase. Phosgene is then passed into the mixture at a temperature between 0° C. and 80° C., preferably between 15° C. and 40° C., and at a pH value between 9 and 14. After the phosgenation, the polycondensation is carried out by adding 0.2–5 mol % of a tertiary aliphatic amine, relative to the molar amount of diphenol. In this procedure, phosgenation times of between 5 minutes and 3 hours, in particular between 10 minutes and 2 hours, are required and polycondensation times of between 3 minutes and 3 hours, preferably between 5 and 60 minutes, are required.

The resulting solutions of the polycarbonate elastomers in the organic solvents are worked up analogously to the solutions of the thermoplastic polycarbonates prepared in accordance with the two-phase boundary process; the polycarbonate elastomers are either (a) isolated by known processes, for example, by precipitating with methanol or ethanol, and then dried and tempered, or dissolved in organic solvents and allowed to gel, or (b) allowed to gel, before isolation, in the solvent used in the preparation of the polycarbonate elastomers by the two-phase interface process.

Suitable organic solvents for the two-phase interface process are chlorohydrocarbons which are water immiscible, such as methylene chloride, chloroform and 1,2-dichloroethane, but also chlorinated aromatics which are not water-miscible, such as chlorobenzene, dichlorobenzene and chlorotoluene, or mixtures of the above-mentioned solvents.

Solutions of Li(OH)$_2$, NaOH, KOH, Ca(OH)$_2$ and/or Ba(OH)$_2$ in water are suitable as the aqueous-alkaline phase.

Suitable tertiary aliphatic amines are those with 3 to 15 C atoms, that is to say, for example, trimethylamine, triethylamine, n-tripropylamine and n-tributylamine.

The polycarbonate elastomers can be isolated according to either of the following methods:

(a) By distilling off the organic solvent down to a certain concentration, until a high strength (about 30–40% by weight) polymer solution is obtained. Thereafter, by slowly evaporating the remaining solvent, the polycarbonate elastomer will gel.

(b) By precipitating the polycarbonate elastomers from the organic phase using organic solvents. Examples of suitable solvents for the precipitation are methanol, ethanol, isopropanol, acetone, aliphatic hydrocarbons and cycloaliphatic hydrocarbons.

The gelling of the polycarbonate elastomers, either in the worked up organic phase of the two-phase reaction mixture, without isolation, or in a separate solution of the previously isolated polycarbonate elastomers in organic solvents, is carried out by cooling the high-strength polymer solution, between 5 minutes and 12 hours being required for the gelling, at temperatures between 0° C. and 40° C., depending on the proportion of elastomer or polycarbonate.

The gelled product can be worked up to give a powder grain mixture, the resulting polycarbonate elastomer being dried in vacuo for 48 hours at 50° C. and 24 hours at 180° C.

Suitable solvents for the separate gelling of the isolated polycarbonate elastomers are methylene chloride, benzene, toluene, xylene, chlorobenzene and further organic solvents.

The heat treatment of the isolated polycarbonate elastomers is carried out for between 5 minutes and 24 hours at temperatures between 40° C. and 100° C.

The reaction, according to the invention, of COOH-containing polymers, diphenols and phosgene by the two-phase interface process is carried out virtually quantitatively, so that by choosing the reactant ratio (expressed in % by weight=COOH-containing polymer to diphenol) the composition of the polycarbonate elastomers can be determined.

Thus, for example, for the preparation, according to the invention, of polybutadiene-(bisphenol A polycarbonates), the reactant ratio of COOH-containing polymer to bisphenol A is in general between 70–5% by weight and 27–85% by weight, preferably between 65–20% by weight and 31.5–72% by weight.

The molar reactant ratio is, for example, for polymer dicarboxylic acids to phosgene, 1:5, preferably 1:3.

The amount of phosgene depends, for example, on the dicarboxylic acid employed, the diphenol employed, the stirring action and the reaction temperature, which can be between 0° C. and about 80° C.

Similar reactant ratios are present when polymer mono-, tris-, tetra or penta-carboxylic acids are used according to the invention.

The molar reactant ratio of bisphenol to phosgene is in general 1:1.5. Monophenols, trisphenols and phenols with more than three phenolic hydroxyl groups which are employed at the same time are included in the calculation by taking their phenolic equivalent into account.

The proportion of polycarbonate in the polycarbonate elastomer prepared by the process according to the invention can thus be between 30 and 95, preferably between 35 and 80,% by weight, depending on the desired pattern of properties, the hardness and dimensional stability under heat increasing and the elasticity and elongation at break decreasing with an increasing proportion of polycarbonate.

The high-molecular weight, statistically segmented, polycarbonate elastomers prepared by the process according to the invention are characterized in that the elastomer constituent is present in the amorphous form and has a transformation temperature, determined by differential thermoanalysis, between $-100°$ C. and $+100°$ C., preferably between $-80°$ C. and $+20°$ C., and in that the polycarbonate constituent is present in the partially crystalline form with a crystallite melting point of the crystalline polycarbonate constituent of at least $160°$ C., preferably between $165°$ C. and $250°$ C., and in that the transformation temperature of the amorphous polycarbonate constituent is above $80°$ C., preferably above $100°$ C.

This difference in the transformation temperature of the elastomer constituent and the transformation temperature and crystallite melting point of the polycarbonate constituent is characteristic for the presence of the phase separation between the elastomer constituent and the polycarbonate constituent.

The polycarbonate elastomers according to the invention should have average molecular weights $\overline{M}w$ (weight-average) of 15,000 to 200,000, preferably of 30,000 to 140,000, determined in accordance with the light-scattering method using a scattered light photometer. The relative solution viscosity $\eta_{rel}$ (measured on 0.5 g in 100 ml of $CH_2Cl_2$ at $25°$ C.) should be between 1.2 and 2.8, preferably between 1.4 and 2.2.

The partial crystallinity, which can be detected by a measurable fusion enthalpy, which is at least 1-8 cal/g of polymer, of the polycarbonate constituent of the polycarbonate elastomers prepared according to the invention, can be increased by a further 50% by stretching and by the subsequent heat treatment mentioned (5 minutes to 25 hours) at $40°–100°$ C., whereupon the dimensional stability under heat of the products increases and the appearance alters from transparent to opaque to non-transparent.

The partially crystalline elastic polycarbonate elastomers can be subjected to thermoplastic processing at temperatures between $130°$ and $230°$ C., in each case below or in the region of the crystallite melting point of the crystalline polycarbonate constituent and below the cross-linking temperature of the elastomer constituent, whereupon a substantial proportion of the crystallinity is retained. Amorphous, transparent products are obtained at processing temperatures above the crystallite melting point of the crystalline polycarbonate constituent.

The crystalline proportion of the polycarbonate constituent of the polycarbonate elastomers according to the invention can thus be varied and, in order to have a good dimensional stability under heat of the polycarbonate elastomers in practice, is about 1-8 cal/g of polymer, preferably 2.5-5.5 cal/g of polymer.

If the process according to the invention is carried out by working up the polycarbonate elastomers without heat treatment and without gelling them, single-phase polycarbonate elastomers are obtained, that is to say those products with only one transformation temperature which can be measured by means of differential thermoanalysis. The present invention thus also relates to a process for the preparation of single-phase polycarbonate elastomers and to new single-phase polycarbonate elastomers obtainable according to the process of the invention.

If the C—C linked polymers used in the process according to the invention are those which are prepared by the copolymerization of acrylic acid in amounts of up to about 1 mol %, relative to polymerizable monomers employed, C—C linked polymers, which are suitable according to the invention, with at least 2 carboxyl groups, which are statistically distributed in the C—C polymer, are obtained. Examples of such C—C polymers, which are suitable according to the invention, with a $\overline{M}n$ of, in particular, about 1,000 to 20,000 are butadiene/acrylonitrile/acrylic acid copolymers, butadiene/ethyl acrylate/acrylic acid copolymers or butadiene/styrene/acrylic acid copolymers.

The stabilizing of the polycarbonate elastomers can be effected, for the elastomer constituent, with customary stabilizers for rubber, for example, stabilizers of the alkylated mononuclear or polynuclear phenol type and of the thioether or alkylated phenols type. It is also possible to add compounds having a synergistic action, for example, of the thiobisalkanoic acid ester type and of the alkylphenyl phosphite type.

The stabilization of the polycarbonate part in the polycarbonate elastomer can be improved by amounts of UV stabilizing agents customary for thermoplastic polycarbonates, such as, for example, substituted benzophenone or benztriazoles by stabilizers against hydrolysis, such as, for example, monocarbodiimides and, above all, polycarbodiimides (compare W. Neumann, J. Peter, H. Holtschmidt and W. Kallert. Proceeding of the 4th Rubber Technology Conference, London, May 22-25, 1962, page 738-751) in amounts of 0.2-5% by weight, relative to polycarbonate elastomer, and by anti-aging agents known in the chemistry of thermoplastic polycarbonates.

In order to modify the products according to the invention, it is possible to add substances such as, for example, carbon black, kieselguhr, kaolin, clays, $CaF_2$, $CaCO_3$, aluminum oxides and customary glass fibers, in amounts of 2 to 40% by weight, in each case relative to the total weight, and inorganic pigments, both as fillers and as nucleating agents.

If flame-repellent products are desired, about 5 to 15% by weight, relative to polycarbonate elastomer, of flame-proofing agents known in the chemistry of thermoplastic rubbers and thermoplastic polycarbonates, such as, for example, antimony trioxide, tetrabromophthalic anhydride, hexabromocyclododecane, tetrachloro- or tetrabromo-bisphenol or tris-(2,3-dichloropropyl) phosphate, can be admixed, the tetrachloro- and tetrabromo-bisphenols statistically incorporated in the polycarbonate blocks of the polycarbonate elastomers also giving rise to flame-repellent properties.

Furthermore, processing auxiliaries, such as mold release agents, known in the chemistry of thermoplastic rubbers and thermoplastic polycarbonates can be used effectively.

The polycarbonate elastomers obtained by the process according to the invention can be advantageously used in all instances where a combination of hardness (due to the polycarbonate segment) and elasticity (due to the segment containing carboxyl groups), in particular of cold flexibility (due to the segment containing purely aliphatic carboxyl groups) is desired, for example, in the construction of vehicle bodies, for the manufacture of low pressure types for vehicles, for sheathing for hoses, sheets and tubes and for flexible drive pulleys.

In the examples which follow the relative solution viscosity $\eta_{rel}$ is defined as the viscosity of 0.5 g of polycarbonate elastomer in 100 ml of methylene chloride at 25° C.; the tensile strength and elongation at break are determined according to DIN 53,455.

Investigations by gel chromatography were carried out in tetrahydrofurane using Styragel columns (separation range; $1.5 \times 10^5$ Å, $1 \times 10^5$ Å, $3 \times 10^4$ Å and $2 \times 10^3$ Å at room temperature. The calibration of bisphenol A polycarbonate was used for the determination. In comparison with the $\overline{M}w$ determination by the light-scattering method, no large deviations were found.

The differential thermoanalysis (DTA) was carried out with the "Du Pont, Model 900" apparatus. For the interpretation of the transformation temperature, the approximate middle of the softening range, according to the tangent method, was chosen and for the crystallite melting point the approximate middle of the endothermic peak of the melting curve was chosen.

EXAMPLE 1

91.3 parts by weight of 2,2-bis-(4-hydroxyphenyl)-propane (bisphenol A) are dissolved in 32 parts by weight of sodium hydroxide and 1,300 parts by weight of distilled water. A solution of 102 parts by weight of the COOH-terminated butadiene oil, HYCAR CTB (2,000×162) ($\overline{M}n=3,500$) from Messrs. Goodrich and 1,725 parts by weight of methylene chloride is added to this solution. 90 parts by weight of phosgene are passed in over the course of 85 minutes at 20°-25° C., while stirring and under a nitrogen atmosphere. While passing in phosgene, 267 parts by weight of 45% strength sodium hydroxide solution are, at the same time, added dropwise, so that the pH value remains constant at a pH of 13. After passing in the phosgene, 0.4 parts by weight of triethylamine is added and the mixture is stirred for 60 minutes. After adjusting to a pH of 7-8, the organic phase is separated off and washed successively with 2% strength phosphoric acid and finally with distilled water until free from electrolytes. After separating off the water, the organic phase is divided and worked up by the following processes:

(1.a) A high-strength polymer solution is obtained by distilling off the methylene chloride down to a certain concentration or by adding chlorobenzene to the organic phase and distilling off the entire methylene chloride. The polybutadiene polycarbonate gels by subsequent slow evaporation of the remaining methylene chloride or of the chlorobenzene and can be worked up further to give a powder grain mixture. The polybutadiene polycarbonate is dried in vacuo for 48 hours at 50° C. and 24 hours at 80° C.

(1.b) A finely divided solid product is obtained by distilling off the solvent, drying the residue in a vacuum drying cabinet, tempered between 80° C. and 100° C. and subsequently grinding it.

(1.c) By precipitating the polymer from the solution, using, for example, methanol, ethanol, acetone or aliphatic or cycloaliphatic hydrocarbons, subsequently drying the precipitate in a vacuum drying cabinet and tempered between 80° C. and 100° C.

The relative solution viscosity $\eta_{rel}$ of the polybutadiene polycarbonate is 1.56. According to a determination by gel chromatography, the polymer has a maximum of 37,500. The mechanical properties of a film cast from methylene chloride are:
tensile strength: 34.1 (MPa)
elongation at break: 359 (%).

According to differential thermoanalysis (DTA), the granular product exhibits a glass transition temperature of the polybutadiene part of −80° C., a transformation temperature of the amorphous polycarbonate part of 125° C. and a crystallite melting point of the crystalline polycarbonate part of about 210° C. The fusion enthalpy of the crystalline polycarbonate constituent is between 2.5–5.5 cal/g of polymer.

EXAMPLE 1.1

Example 1 is repeated, the entire methylene chloride being very rapidly distilled off in the working up according to 1(a) so that no gelling of the product occurs. The polymer is then dried at 20° C. in a vacuum drying cabinet.

A transparent single-phase polybutadiene polycarbonate with $\eta_{rel}=1.58$ is obtained.

EXAMPLE 2

228.3 parts by weight of 2,2-bis-(4-hydroxyphenyl)-propane and 3 parts by weight of p-tert.-butylphenol are dissolved in 80 parts by weight of sodium hydroxide and 1,000 parts by weight of distilled water. A solution of 28.3 g of the COOH-terminated butadiene oil in Example 1 and 2,500 parts by weight of methylene chloride is added to this solution. 198 parts by weight of phosgene are passed in over the course of 1.5 hours at 20°-25° C., while stirring and under a nitrogen atmosphere, and a constant pH value of 13 is maintained by simultaneously adding 370 parts by weight of 45% strength sodium hydroxide solution dropwise. After passing in the phosgene, 1 part by weight of triethylamine is added. The mixture becomes more viscous. After 60 minutes, the organic phase is separated off and the polybutadiene polycarbonate is isolated as described in Example 1 (working-up according to pound). $\eta_{rel}$ of the polybutadiene polycarbonate is 1.30. According to a determination by gel chromatography, the polymer has a maximum at 35,000.

The mechanical properties of a film cast from methylene chloride are:
tensile strength: 67.4 (MPa)
elongation at break: 174 (%).

EXAMPLE 3

114.2 parts by weight of 2,2-bis-(4-hydroxyphenyl)-propane are dissolved in 500 parts by weight of 2 N NaOH and 1,200 parts by weight of distilled water. A solution of 127 parts by weight of the COOH-terminated butadiene/acrylonitrile oil HYCAR CTBN (1,300×8) ($\overline{M}n=3,030$) from Messrs. Goodrich and 2,250 parts by weight of methylene chloride is added to this solution. 99 parts by weight of phosgene are passed in in the course of 1¼ hours at 20°-25° C., while stirring and under a nitrogen atmosphere, and a constant pH value of 13 is maintained by simultaneously adding 280 parts by weight of 45% strength sodium hydroxide solution dropwise. After passing in the phosgene, 51 parts by weight of a 1% strength triethylamine solution are added. The mixture becomes more viscous. After 30 minutes, the organic phase is separated off and the polycarbonate elastomer is isolated as described in Example 1 (working up according to 1(b). $\eta_{rel}$ of the polycarbonate elastomer is 1.38.

According to differential thermoanalysis (DTA), the granular product exhibits a glass transition temperature of the polybutadiene/acrylonitrile part of −53° C., a transformation temperature of the amorphous polycarbonate part of 125° C. and a crystallite melting point of the crystalline polycarbonate part of about 210° C. The fusion enthalpy of the crystalline polycarbonate constituent is between 2.5–5.5 cal/g of polymer.

EXAMPLE 4

162 parts by weight of 2,2-bis-(4-hydroxyphenyl)-propane and 2.13 parts by weight of p-tert.-butylphenol are dissolved in 56 parts by weight of sodium hydroxide and 1,300 parts by weight of distilled water. A solution of 20 parts by weight of the COOH-terminated butadiene oil HYCAR CTBN (1,300×8) from Messrs. Goodrich and 1,725 parts by weight of methylene chloride is added to this solution. 140 parts by weight of phosgene are passed in over the course of 1 hour at 20°–25° C., while stirring and under a nitrogen atmosphere, and a constant pH value of 13 is maintained by simultaneously adding 222 parts by weight of 45% strength sodium hydroxide slution dropwwise.

After passing in the phosgene, 0.7 part by weight of triethylamine is added. The mixture becomes more viscous. After 60 minutes, the organic phase is separated off and the polymer is isolated as described in Example 1 (working up according to pound). $\eta_{rel}$ of the polymer is 1.38.

The mechanical properties of a film cast from methylene chloride are:
tensile strength: 69.5 (MPa)
elongation at break: 151 (%).

EXAMPLE 5

90 parts by weight of 2,2-bis-(4-hydroxyphenyl)-propane are dissolved in 32 parts by weight of sodium hydroxide and 1,300 parts by weight of distilled water. A solution of 100 parts by weight of the COOH-terminated butadiene oil type C-100 A$_2$ ($\overline{M}n$=1,450) from Messrs. Hystl Development Company and 1,725 parts by weight of methylene chloride is added to this solution. 146.5 parts by weight of phosgene are passed in over the course of 1 hour at 20°–25° C., while stirring and under a nitrogen atmosphere, and a constant pH value of 13 is maintained by simultaneously adding 237 parts by weight of 45% strength sodium hydroxide solution dropwise. After passing in the phosgene, 0.4 part by weight of triethylamine is added. The mixture becomes more viscous. After 30 minutes the organic phase is separated off and the polycarbonate elastomer is isolated as described in Example 1 (working up according to pound). $\eta_{rel}$ of the polycarbonate elastomer is 1.29.

EXAMPLE 6

162 parts by weight of 2,2-bis-(4-hyroxyphenyl)propane and 2.13 parts by weight of p-tert.-butylphenol are dissolved in 56 parts by weight of sodium hydroxide and 1,300 parts by weight of distilled water. A solution of 20 parts by weight of the COOH-terminated butadiene oil Type C-1000 A$_2$ from Messrs. Hystl and 1,725 parts by weight of methylene chloride is added to this solution. 148 parts by weight of phosgene are passed in over the course of 1 hour 20°–25° C., while stirring and under a nitrogen atmosphere, and a constant pH value of 13 is maintained by simultaneously adding 296 parts by weight of 45% strength sodium hydroxide solution dropwise. After passing in the phosgene, 0.7 part by weight of triethylamine is added. The mixture becomes more viscous. After 60 minutes the organic phase is separated off and the polycarbonate elastomer is isolated as described in Example 1 (working up according to pound). $\eta_{rel}$ of the polycarbonate elastomer is 1.32.

EXAMPLE 7

114.2 parts by weight of 2,2-bis-(4-hydroxyphenyl)-propane are dissolved in 40 parts by weight of NaOH and 1,700 parts by weight of distilled water. A solution of 127 parts by weight of a polymer ($\overline{M}n$ about 10,000) of 50 parts by weight of styrene, 49.9% by weight of butyl acrylate and 0.1% by weight of acrylic acid in 2,250 parts by weight of methylene chloride is added to this solution. 149 parts by weight phosgene are passed in over the course of 1¼ hours at 20°–25° C. and a constant pH value of 13 is maintained by simultaneously adding 330 parts by weight of 45% strength NaOH dropwise. After passing in the phosgene, 0.5 part by weight of triethylamine is added. The mixture becomes more viscous.

After 60 minutes, the organic phase is separated off and the polymer is isolated as described in Example 1 (working up according to pound). $\eta_{rel}$ of the polymer is 1.65.

EXAMPLE 8

114.2 parts by weight of 2,2-bis-(4-hydroxyphenyl)-propane are dissolved in 40 parts by weight of NaOH and 1,700 parts by weight of distilled water. A solution of 127 parts by weight of a polymer ($\overline{M}n$ about 10,000) of 60% by weight of styrene, 39.8% by weight of acrylonitrile and 0.2 % by weight of acrylic acid in 2,250 parts by weight of methylene chloride is added to this solution. 99 parts by weight of phosgene are passed in over the course of 1¼ hours at 20°–25° C., and a constant pH value of 13 is maintained by simultaneously adding 220 parts by weight of 45% strength NaOH dropwise. After phosgenation, 0.5 part by weight of triethylamine is added. The mixture becomes more viscous.

After 60 minutes, the organic phase is separated off and the polymer is isolated as described in Example 1 (working up according to pound). $\eta_{rel}$ of the polymer is 1.41.

EXAMPLE 9

91 parts of 4,4'-dihydroxydiphenyl-2,2-propane are suspended in 450 parts of water. The oxygen is removed from the mixture in a 3-necked flask, fitted with a stirrer and gas inlet tube, by passing nitrogen through the reaction mixture for 15 minutes, while stirring. 75 parts of 45% strength sodium hydroxide solution and 900 parts of methylene chloride are then added. The mixture is cooled to 25° C. 50 parts of phosgene are added over a period of 120 minutes, and the temperature is maintained at 25° C. by cooling. After the absorption of phosgene has started, an additional amount of 50 parts of 45% strength sodium hydroxide solution is added after 60–90 minutes. After 35 g and before 45 g of phosgene have been passed in, a solution of 61 parts of polybutadiene with terminal carboxyl groups (Hystl Type C-1000 A$_2$; COOH content: 4.4–4.7%) in 100 parts of methylene chloride is added dropwise. After the phosgene has been passed in, 0.2 part of triethylamine is added to the solution formed and the mixture is stirred for a further 60 minutes. A highly viscous solution is obtained, the viscosity of which is controlled by adding methylene chloride. The aqueous phase is separated off. The organic phase is acidified with 2% strength phosphoric acid and then washed with water until free from salts and electrolytes. The polymer is isolated from the washed solution and dried. It has a relative viscosity of 1.260, measured in a 5% strength solution in methylene chloride at 20° C.

EXAMPLE 10

45.5 parts of 4,4'-dihydroxydiphenyl-2,2-propane are suspended in 325 parts of water. The oxygen is removed from the reaction mixture in a 3-necked flask, fitted with a stirrer and gas inlet tube, by passing nitrogen through the reaction mixture for 15 minutes, while stirring. 80 parts of 45% strength sodium hydroxide solution and 500 parts of methylene chloride are then added. The mixture is cooled to 25° C. 33 parts of phosgene are passed in over the course of 60 minutes, while maintaining this temperature by cooling. From the start of the introduction of the phosgene and until 10 parts of phosgene have been passed in, a solution of 45.5 g of polybutadiene (see Example 9) in 450 parts of methylene chloride is added dropwise.

After the phosgene has been passed in, 0.2 part of triethylamine is added to the solution formed and the mixture is stirred for a further 60 minutes. Working up corresponds to that in Example 9. The relative viscosity of the polymer is 1.315.

EXAMPLE 11

Example 10 is carried out using 36.4 parts of 4,4'-dihydroxydiphenyl-2,2-propane and 54.6 parts of polybutadiene. The relative viscosity of the polymer is 1.315.

EXAMPLE 12

39 parts of polybutadiene (see Example 9) are dissolved in 450 parts of methylene chloride (solution I). 7 g of phosgene are passed into the solution and the reaction mixture formed is stirred for a further 10 minutes. A solution of 91 parts of 4,4'-dihydroxydiphenyl-2,2-propane in 540 parts of 7.5% strength sodium hydroxide solution (solution II) and a further 450 parts of methylene chloride are then added to the reaction mixture. The mixture is cooled to 25° C. While maintaining this temperature by cooling, a further 50 parts of phosgene are passed in over the course of 120 minutes. Additional amount of 45 parts of 45% strength sodium hydroxide solution is added after 60–120 minutes, after passing in of the 50 parts of phosgene has been started. After the phosgene has been passed in, 0.2 part of triethylamine is added to the solution formed and the mixture is stirred for a further 60 minutes. The further working up corresponds to that in Example 9. The relative viscosity of the polymer is 1.570.

EXAMPLE 13

Example 12 is repeated except that 1 part of p-tert.-butylphenol is added as a chain stopper to the solution of 4,4'-dihydroxy diphenyl-2,2-propane in sodium hydroxide solution. The relative viscosity of the polymer is 1.400.

After being cast to give films, the products obtained from Examples 9 to 13 are slightly cloudy. At higher contents of polybutadiene (about 50% by weight), the films exhibit rubbery elastic properties.

Although the invention has been described in detail in the foregoing for the purpose of illustration, it is to be understood in such detail is solely for that purpose, and that variation can be made therein by those skilled in the art without departing from the spirit and scope of the invention except as it may be limited by the claims.

What is claimed is:

1. A process for the preparation of a high-molecular weight polycarbonate elastomer containing incorporated polymer segments, which segments contain carboxyl groups, comprising reacting a carboxyl group-containing polymer having an average molecular weight ($\overline{M}n$) of more than about 600 with a diphenol and phosgene in accordance with a two-phase boundary polycondensation process at a pH of from about 9 to about 14 and a temperature of from about 0° C. to about 80° C., characterized in that the carboxyl group-containing polymer is a C—C linked polymer containing from 1 to 5 COOH groups.

2. The process according to claim 1, wherein the average molecular weight ($\overline{M}n$) is more than 800.

3. The process according to claim 2, wherein the average molecular weight ($\overline{M}n$) is from 1,000 to 20,000.

4. The process according to claim 1, wherein the temperature is from about 15° C. to about 40° C.

5. The process according to claim 1, wherein the reaction product of the process is subsequently either heat treated at a temperature of from about 40° C. to about 100° C. for from about 5 minutes to about 24 hours, or gelled in solution in an organic solvent.

6. The process according to claim 1, wherein the carboxyl group-containing polymer contains 2 or 3 COOH groups.

7. The process according to claim 1, wherein from about 0.05 to about 2.0 mol %, based on the weight of diphenol, of a compound containing at least three phenolic hydroxy groups is included in the reaction mixture.

8. The process according to claim 1, wherein the polycondensation occurs in the presence of a water-immiscible chlorohydrocarbon solvent.

9. The process according to claim 1, wherein the molar ratio of carboxyl group-containing polymer to phosgene is 1:3.

10. The process according to claim 1, wherein the molar ratio of bisphenol to phosgene is 1:1.5.

11. The process according to claim 1, wherein the proportion of polycarbonate in the elastomer is from 30 to 95% by weight.

12. The process according to claim 1, wherein the elastomer constituent is in an amorphous form and has a transformation temperature, determined by differential themoanalysis, of between about −100° C. and about +100° C., and the polycarbonate constituent is present in a partially crystalline form with a crystalline melting point of at least 160° C.

13. The process according to claim 1, wherein the elastomer has an average molecular weight $\overline{M}w$ of from about 15,000 to about 200,000 and a relative solution viscosity $\eta_{rel}$ (measured on 0.5 g in 100 ml of $CH_2Cl_2$ at 25° C.) of from about 1.2 to about 2.8.

14. The process according to claim 1, further comprising members selected from the group consisting of a stabilizer, a filler, a nucleating agent, a flame-proofing agent and a mold release agent.

* * * * *